United States Patent
Said et al.

(10) Patent No.: US 11,481,860 B2
(45) Date of Patent: Oct. 25, 2022

(54) SYSTEM FOR INCREASING BETTING LEVEL OF PROFITABILITY AND METHODS OF USE

(71) Applicant: Aiya LLC, Atlanta, GA (US)

(72) Inventors: Samar Ayoub Said, Woodstock, GA (US); Israel R J Dudley, Woodstock, GA (US)

(73) Assignee: Aiya LLC, Atlanta, GA (US)

( * ) Notice: Subject to any disclaimer, the term of this patent is extended or adjusted under 35 U.S.C. 154(b) by 0 days.

(21) Appl. No.: 17/405,131

(22) Filed: Aug. 18, 2021

(65) Prior Publication Data

US 2021/0398240 A1   Dec. 23, 2021

Related U.S. Application Data

(63) Continuation of application No. 15/979,433, filed on May 14, 2018, now Pat. No. 11,127,103.

(60) Provisional application No. 62/637,171, filed on Mar. 1, 2018, provisional application No. 62/506,604, filed on May 15, 2017.

(51) Int. Cl.
    *G06Q 50/34* (2012.01)
    *G07F 17/32* (2006.01)
    *G06Q 40/06* (2012.01)
    *A63F 13/00* (2014.01)

(52) U.S. Cl.
    CPC ............ *G06Q 50/34* (2013.01); *A63F 13/00* (2013.01); *G06Q 40/06* (2013.01); *G07F 17/3288* (2013.01)

(58) Field of Classification Search
    CPC ........ G06Q 50/34; G06Q 40/06; A63F 13/00; G07F 17/3288
    See application file for complete search history.

(56) References Cited

U.S. PATENT DOCUMENTS

| | | | |
|---|---|---|---|
| 6,500,066 B1 | 12/2002 | Bower et al. | |
| 6,511,376 B2 | 1/2003 | Walker et al. | |
| 7,685,278 B2 | 3/2010 | Cohen et al. | |
| 7,707,061 B2 | 4/2010 | van der Linde | |
| 8,515,789 B1 | 8/2013 | Lendler | |
| 8,839,418 B2 | 9/2014 | Hulten et al. | |
| 8,924,242 B2 | 12/2014 | Noyes | |
| 2002/0037767 A1 | 3/2002 | Ebin | |
| 2003/0014291 A1 | 1/2003 | Kane et al. | |

(Continued)

*Primary Examiner* — Bennett M Sigmond
*Assistant Examiner* — Marla Hudson
(74) *Attorney, Agent, or Firm* — Richard C. Piercy; Grell & Watson Patent Attorneys LLC (57) ABSTRACT

A system for increasing the betting level of profitability via a bet information advisor platform and methods of use, a computer platform having applications to select or identify Bet Information data sources, assign an Age consistency score to each Bet Information data source based on age of source assign a ROI score to each Bet Information data source for each match or game outcome based on profits earned or lost, assign or calculate an Overall Efficiency score for each Bet Information data sources based on Age consistency score and ROI grade/percentage score, utilize Bet Information data sources with an Overall Efficiency score greater than or equal to Threshold for current plays or bets, allocate x %/y %/z % plays or bets to Bet Information data sources 1×/2×/3× Threshold, track each losing positons and the Bet Information data sources associated therewith, assign an increased Risk Amount to the losing Bet Information data sources.

20 Claims, 5 Drawing Sheets

(56) References Cited

U.S. PATENT DOCUMENTS

| | | |
|---|---|---|
| 2004/0098742 A1 | 5/2004 | Hsieh et al. |
| 2010/0304826 A1 | 12/2010 | Chevallier-Mames et al. |
| 2012/0316916 A1 | 12/2012 | Andrews et al. |
| 2013/0303271 A1 | 11/2013 | Lendler |
| 2013/0339132 A1 | 12/2013 | von Gonten et al. |
| 2016/0034927 A1 | 2/2016 | Grushka |
| 2017/0169656 A1 | 6/2017 | Froy, Jr. |

SYSTEM FOR INCREASING BETTING LEVEL OF PROFITABILITY AND METHODS OF USE

CROSS-REFERENCE TO RELATED APPLICATIONS

To the full extent permitted by law, the present application is a continuation of U.S. patent application Ser. No. 15/979,433 filed May 14, 2018, entitled "System For Increasing Betting Level of Profitability and Methods of Use", which claims priority to and the full benefit of U.S. Provisional Application No. 62/506,604 filed May 15, 2017, entitled "Method of Increasing the Betting Public or Sports Investors Level of Profitability", and U.S. Provisional Application No. 62/637,171 filed Mar. 1, 2018, entitled "Method of Increasing the Betting Public or Sports Investors Level of Profitability", which are incorporated herein by reference in their entirety.

TECHNICAL FIELD

The disclosure relates generally to a system to utilize betting information and, more specifically, to utilize betting information and biometrics to increase chances or odds of obtaining a better than average level of profitability.

BACKGROUND

Currently, in the betting industry the betting pubic including the experienced sports betting investor (Bettor) searches for free and purchased data or advice (Bet Information) in order to gain an advantage on certain bet types, such as a risk or position against the spread, on the money line, on the total, on their fantasy sports mock draft lineup/team, or a combination of two or more risk or positions known as a combo risk/bet "Parlay" or "Teaser" or Pari-Mutuel risk. When the Bettor looks to obtain the sought-after Bet Information they eventually come across numerous websites or handicapping information outlets that simply over load the Bettor with an assortment of data, trends, power rankings, game simulators or fantasy sports mock draft line up projections. Moreover, the Bettor seeking Bettor Information will come across bet advisor or sports handicapper individuals, also known as tipsters, sports bet advisors/experts (Bet Advisors), who push performance records or profit margins, which only mention recent performance data or hot streaks without providing long term data and trends.

The majority of the Bettor Information provided by these companies entices a Bettor to overextend themselves financially, while the provider of Bettor Information and Bet Advisors is only hoping to hit a hot streak of wins based thereon, so that the Bet Advisors or providers of Bettor Information service look to capitalize on a sale or revenue based on a mirage of recent wins from the sports risk/risk or wager positon provided. One disadvantage of this approach is that a large portion of Bettors who lose are left holding the financial deficit based on losses and poor money management guidance from these Bet Advisors or providers of Bettor Information services.

Another disadvantage of this approach is that Bet Advisors or providers of Bettor Information services misleads in one way or another, by exhibiting false winning streaks, while only mentioning recent wins and not losses.

Still another disadvantage of this approach is that Bet Advisors or providers of Bettor Information services who provide accurate wins and losses do not truly represent the profit and loss in the form of accurate dollars risk and paid out as they all grade wins on payouts with odds of −101 up to −300 odds as a $100 payout when the true payout on a win with −120 odds for example is $83.33 not $100. Therefore, all handicapper profits expressed are not 100% accurate and somewhat misleading.

Still another disadvantage of this approach is that Bet Advisors or providers of Bettor Information services offer Free positions on a match, game or mock draft or free data to allow the public or bettor the opportunity to sample their service but most of these services do not include the Free Pick or position as a graded result within their leader board totals or overall tracked records, for the services that even attempt to track data or handicapper performance.

Furthermore, no existing Bet Advisors or providers of Bettor Information services offer enough data to give the typical bettor or sports investor an advantage to perform above the historical average level of profits on very popular risk or bets such as Parlays or Combo bet Teasers or tracked and monitored advice on Fantasy Football, baseball and basketball data lineups and mock drafts.

To this end various these Bet Advisors or providers of Bettor Information services to promote successful handicapper, data and informational advice, but none break down every aspect and component needed in order to profit at a higher rate that is clearly documented at sources such as gaming.unlv.edu as an example.

Therefore, it is readily apparent that there is a recognizable unmet need for a system for increasing the betting level of profitability and methods of use. This system and method perform the appropriate functions to provide long term Bettor Information performance data and trends along with recent performance data or hot streaks Bettor Information providing the Bettor with full picture data and trends without the enticements to overextend themselves financially. Moreover, this system and method perform the appropriate functions to avoid uninformed financial deficit based on losses and poor money management guidance from these Bet Advisors or providers of Bettor Information services. Furthermore, this system and method perform the appropriate functions to accurately exhibit or disclose winning streaks and losing streaks and not just mentioning recent wins.

Still furthermore, this system and method perform the appropriate functions to accurately exhibit or disclose profits and losses in the form of accurate dollars risked and true payout on a win and not grade wins with odds. Yet still furthermore, this system and method perform the appropriate functions to accurately exhibit or disclose Free positions on a match, game or mock draft or free data as a graded result within their leader board totals or overall tracked records. Yet still furthermore, this system and method perform the appropriate functions to accurately exhibit or disclose Bettor Information with the objective to perform above the historical average level of profits on very popular risk or bets such as Parlays or Combo bet Teasers or tracked and monitored advice on Fantasy Football, baseball and basketball data lineups and mock drafts. Yet still furthermore, this system and method perform the appropriate functions to accurately exhibit or disclose Bettor Information with the objective to break down every aspect and component of handicapper, data and informational advice needed in order to profit at a higher rate.

BRIEF SUMMARY

Briefly described, in example embodiment, the present system and method overcomes the above-mentioned disadvantages, and meets the recognized need for a system for increasing the betting level of profitability via a bet information advisor platform and methods of use, including, in general, a computer platform having applications to select or identify Bet Information data sources, assign an Age grade/consistency score to each Bet Information data source (game, match or mock draft player stat) based on age of source (older source lower score), assign a ROI grade/percentage score to each Bet Information data source for each match or game outcome based on profits earned or lost (categorized by sport that turn a profit or loss), assign or calculate an Overall Efficiency score for each Bet Information data sources based on Age grade/consistency score and ROI grade/percentage score, utilize Bet Information data sources with an Overall Efficiency score greater than or equal to Threshold for current plays or bets (selecting team or teams, risk levels, bet types), allocate x %/y %/z % plays or bets to Bet Information data sources 1×/2×/3× Threshold, track each losing positons/picks/wagers and the Bet Information data sources associated therewith, assign an increased Risk Amount to the losing Bet Information data sources.

According to its major aspects and broadly stated, the method/system for increasing the betting level of profitability via a bet information advisor platform and methods of use, including, in general, a computer platform having applications to select or identify Bet Information data sources, assign an Age grade/consistency score to each Bet Information data source (game, match or mock draft player stat) based on age of source (older source lower score), assign a ROI grade/percentage score to each Bet Information data source for each match or game outcome based on profits earned or lost (categorized by sport that turn a profit or loss), assign or calculate an Overall Efficiency score for each Bet Information data sources based on Age grade/consistency score and ROI grade/percentage score, determine a biological or psychological state of a Bettor, utilize Bet Information data sources with an Overall Efficiency score greater than or equal to Threshold for current plays or bets (selecting team or teams, risk levels, bet types), allocate x %/y %/z % plays or bets to Bet Information data sources 1×/2×/3× Threshold, track each losing positons/picks/wagers and the Bet Information data sources associated therewith, assign an increased Risk Amount to the losing Bet Information data sources.

In an exemplary embodiment a computer system to raise the betting level profitability of a bettor, the computer system including, a memory device for storing an instruction, a processor in communication with the memory and configured to execute the instruction the processor receives a bet data from a bet data source, the processor receives a bet type, the processor executes an instruction to assign a consistency score for each the bet data source, the processor executes an instruction to determine a return on investment percentage score for each the bet data source, the processor executes an instruction to determine an overall efficiency score for each the bet data source based on the consistency score and the return on investment percentage score for each the bet data source, the processor executes an instruction to select each the bet data source data source having the overall efficiency score greater than or equal to four, the processor executes an instruction to elect a current day bet utilizing the bet data source data source having the overall efficiency score greater than or equal to four, the processor executes an instruction to track the bet data source having a losing position, and the processor executes an instruction to detrimentally increment a risk amount of the bet data source for a subsequent bet.

In an exemplary embodiment a method of raising the betting level profitability of a bettor, the method utilizing a computer processor to execute an instruction including the steps of inputting bet data from a bet data source, inputting a bet type, assigning a consistency score for each the bet data source, determining a return on investment percentage score for each the bet data source, determining an overall efficiency score for each the bet data source based on the consistency score and the return on investment percentage score for each the bet data source, selecting each the bet data source data source having the overall efficiency score greater than or equal to four, electing a current day bet utilizing the bet data source data source having the overall efficiency score greater than or equal to four, tracking the bet data source having a losing position, and incrementing a risk amount of the bet data source for a subsequent bet.

Accordingly, a feature of the system for increasing the betting level of profitability via a bet information advisor platform and methods of use is the ability to provide long term Bettor Information performance data and trends along with recent performance data or hot streaks Bettor Information providing the Bettor with full picture data and trends without the enticements to over extend themselves financially.

Another feature of the system for increasing the betting level of profitability via a bet information advisor platform and methods of use is the ability to avoid uninformed financial deficit based on losses and poor money management guidance from these Bet Advisors or providers of Bettor Information services.

Still another feature of the betting level of profitability via a bet information advisor platform and methods of use is the ability to accurately exhibit or disclose winning streaks and losing streaks and not just mentioning recent wins.

Still another feature of the betting level of profitability via a bet information advisor platform and methods of use is the to accurately exhibit or disclose profits and losses in the form of accurate dollars risked and true payout on a win and not grade wins with odds.

Still another feature of the betting level of profitability via a bet information advisor platform and methods of use is the ability to perform the appropriate functions to accurately exhibit or disclose Free positions on a match, game or mock draft or free data as a graded result within their leader board totals or overall tracked records.

Yet another feature of the betting level of profitability via a bet information advisor platform and methods of use is the ability to perform the appropriate functions to accurately exhibit or disclose Bettor Information with the objective to perform above the historical average level of profits on very popular risk or bets such as Parlays or Combo bet Teasers or tracked and monitored advice on Fantasy Football, baseball and basketball data lineups and mock drafts.

Yet another feature the betting level of profitability via a bet information advisor platform and methods of use is the ability to accurately exhibit or disclose Bettor Information with the objective to break down every aspect and component of handicapper, data and informational advice needed in order to profit at a higher rate.

Yet another feature of the feature the betting level of profitability via a bet information advisor platform and methods of use is the ability to provide Sports Bettor, Fantasy Sports Team manager, Sports Hedge Fund Manager or Sports Book Line Maker who actively seek Free or Purchased Data and Handicapper or Expert Advice in order to increase their chances or odds of obtaining a better than average level of Profitability. Yet another feature of the betting level of profitability via a bet information advisor platform and methods of use is the ability to include at least one computer processor, data base and user interface which would be included or considered an Agricultural, Assistive, Balancing, Banking, Biotechnological, Building, Cybernetics, Cleanroom, Cleaning Method, Drilling, Domestic Implements, Educational, Electronic, Emerging, Energy, Environmental, Equipment, Explosive, Film/video, Financial, Food, Gas Turbine, Geographical, Home Automation, Industry, Information and Communications, Inventive, Lubrication, Machinery, Medical, Micro, Military, Mining, Missile, Music, Nano, Political, Primitive, Rail, Scientific, Sound, Space, Sports, Tools, Transport, Travel, Vehicle, Waste, Alternative, Architectural, Creative, Disruptive, HighTech, Industrial, Low, Micro, and Open Source Technologies.

Yet another feature of betting level of profitability via a bet information advisor platform and methods of use is the ability to communication with the platform via Video/Live video, website, mobile application coding, text messaging or any form of direct messaging social media site or application, telephone, artificial intelligence or mental telepathy mediums.

Yet another feature of the betting level of profitability via a bet information advisor platform and methods of us is the ability to provide the end user with options to enter personal information, total bankroll or risk investment levels for a given time period.

Yet another feature of the betting level of profitability via a bet information advisor platform and methods of use is the ability to provide the end user with the option to select the risk or investment type and the information or advice type, ranging from Parlays, Teasers, straight positions against the spread, totals or fantasy sports mock draft lineups and also if these are positions before game time, Live Bet or 2nd half positons as Live bet or even second half data or advice.

Yet another feature of the betting level of profitability via a bet information advisor platform and methods of use is the ability to provide the end user with the option to select sports leagues, teams or players that they would like to see within the risk or bet type selected. Yet another feature of the betting level of profitability via a bet information advisor platform and methods of use is the ability to provide Bettor services to novice or average sports bettor, or investor, including a sports hedge fund manager/sports investment broker/advisor, government agency, sports book/ casino odds or lines setter as currently defined under Nevada law, in order to gain an advantage against the average level of profits historically tracked as an industry average and to regulate a fair and ethical means of sports risk position advisement and fund management.

Yet another feature of the betting level of profitability via a bet information advisor platform and methods of use is the ability to provide Bettor services to handicapping firm or investment firm or fund looking to formulate a higher efficiency output for clientele or investors by grading voluntarily submitted risk positions from individual, partnered, employed or contracted handicapper or data providing outfits for straight, parlay/combo and pari-mutuel risk or betting advice.

Yet another feature of the betting level of profitability via a bet information advisor platform and methods of use is the ability to utilize the efficiency score in the logic to reward data source outlets, handicappers, sports investment risk algorithmic creators or any sports investment risk advisor/ broker with a revenue sharing plan or ownership option (form of salary, bonus and or stock options in the governing company or firm) in the governing company or firm based on the total percentage (%) that data source/ advisor contributes or the amount of data provided which impacts the firm or funds overall revenue from production or sales for a given time period.

Yet another feature of the betting level of profitability via a bet information advisor platform and methods of use is the ability to compensate for performance on social media or forum contest. The platform and method can treat individual social media or forum users as consultants or handicappers to compensate based on contest or instructive performance using a crypto currency or any established currency means of exchange. This form of compensation is different than established rebate, affiliate or forum/social media/application contest, as the internet/social media user, looking to grow their projection forecasting or performance ability does not have to make a purchase to be compensated nor do they have to engage outside of their respective internet or social media outlet in an inconvenient manner, also the user/contestant/handicapper in training does not have to make outrageous multiple selections in one single day or very limited timeframe in order to perform or engage in contest or to provide data to the overall application scoring model. The crypto currency or token used to compensate would obtain an established value from partners of the firm who send assets to handicapping firm, sports risk investment firm, hedge fund, marketing outlet or any other company using the system, platform or method.

Yet another feature of the betting level of profitability via a bet information advisor platform and methods of use is the ability to compensate for pooled revenue sharing, especially for revenue generated and utilized amongst numerous advisors or data sources for combination risk performance such as Parlay/Teaser/Combo bet positions or fantasy sport team lineups or even straight risk position data that contribute to a company or single fund(s) performance that is awarded by investors or clients after profits are generated as a performance fee or percentage retained by the company as a percentage (%) of total assets being managed.

Yet another feature of the betting level of profitability via a bet information advisor platform and methods of use is the ability to search internationally pulling information from sports media, handicapping services, fantasy sports advisors or any outlet that provides a side or position on daily professional and collegiate level sporting events, where the dated outlet states a one sided position.

Yet another feature of the betting level of profitability via a bet information advisor platform and methods of use is the ability to tag and store the data by outlet provider or handicapper identifier or sub provider and then grade each position against the actual outcome of the match or sports player's final numbers or stats within the match or game.

Yet another feature of the betting level of profitability via a bet information advisor platform and methods of use is the ability to dictate the true profit or loss earned or lost based on the odds or weight set by the average casino sports book or line maker and store the true profit or loss earned or lost based on the odds or weight in the data base, and the actual paid out amount on wins to be logged with the data outlet providers position.

Yet another feature of the betting level of profitability via a bet information advisor platform and methods of use is the ability to be utilized by gaming and sportsbook companies to aid clientele to be a more responsible and disciplined in comparison to the average bettor, which in turn will yield a longer term, tenured betting public and sports investing environment.

Yet another feature of the betting level of profitability via a bet information advisor platform and methods of use is the ability to enable a more experienced sports investor/bettor to integrate the system with their sportsbook or gaming market that usually sets the price for each position on sporting events/matches and fantasy sports. The sports investor may then use the system to track their own positions on specific risk and wagers and provide a formulated assessment and efficiency grade of that sports investor or sports hedge fund manager's game or fantasy simulated positions. For the professional or end user that wants to become a professional Sports bet position advisor or broker and or sports bet fund manager the efficiency tracker being utilized for their own personal assessment may be formulated with certification test interface that takes the end user through a series of testing questions on sports investment ethics.

The certification testing may include a scoring model against knowledge on acquiring client leads and customer acquisitions, knowledge and difference between offsetting an earlier stake on a given match or risk position by taking an opposite position on the same match in order to cut losses or maximize profits; in comparison to bad ethical advisement of the public or investors be dictating positions on a given match or risk playing both sides of the same bet or risk in effort to solely capitalize on the volumes that the sports betting market offers by giving one client one position and another client/end user/investor the opposite position on the same bet in hopes of putting together a few winners or profits for one client to generate broker or sports investor revenue, while the other client/investor takes losses at the same expense. Testing portion will also assess the prospective sports investment advisor of money management knowledge when coinciding with sports risk positioning when it comes to an end user or clients financial status when under advisement from the sports investment broker. Also sports investor testing on properly executing risk positions on behalf of clients under advisement while using the sports book integration function within the method described. Sports investment certification may be awarded once the prospective sports advisor broker fund manager has reached a certain score on the testing portion formulated with an efficiency score dictated by the handicapping efficiency logic.

Yet another feature of the betting level of profitability via a bet information advisor platform and methods of use is the ability to utilize the system as the standard exchange for ethical sports investment advice monitoring and tracking and scoring.

Yet another feature of the betting level of profitability via a bet information advisor platform and methods of use is the ability to provide LIVE betting or real time betting options providing a similar efficiency graded formula for end users to get real time positions during a game or match against the current LIVE betting or 2nd half odds on the market.

Yet another feature of the betting level of profitability via a bet information advisor platform and methods of use is the ability to provide a text message or any form of direct messaging format as well.

These and other features of the betting level of profitability via a bet information advisor platform and methods of use will become more apparent to one skilled in the art from the following Detailed Description of exemplary embodiments and Claims when read in light of the accompanying drawing Figures.

BRIEF DESCRIPTION OF THE DRAWINGS

The present betting level of profitability via a bet information advisor platform and methods of use will be better understood by reading the Detailed Description of exemplary embodiments with reference to the accompanying drawing figures, in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-5, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

In order to understand the present disclosure certain variables need to be defined. The object field is the entire image being composed. The "key subject point" is defined as the point where the scene converges, i.e., the point in the depth of field that always remains in focus and has no parallax differential. The foreground and background point are the closest point and furthest point from the viewer, respectively. The depth of field is the depth or distance created within the object field (depicted distance from foreground to background). The principal axis is the line perpendicular to the scene passing through the key subject point. The parallax is the displacement of the key subject point from the principal axis. In digital composition the displacement is always maintained as a whole integer number of pixels from the principal axis.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming language may be utilized without departing from the spirit and intent of the present disclosure.

Figure 1:
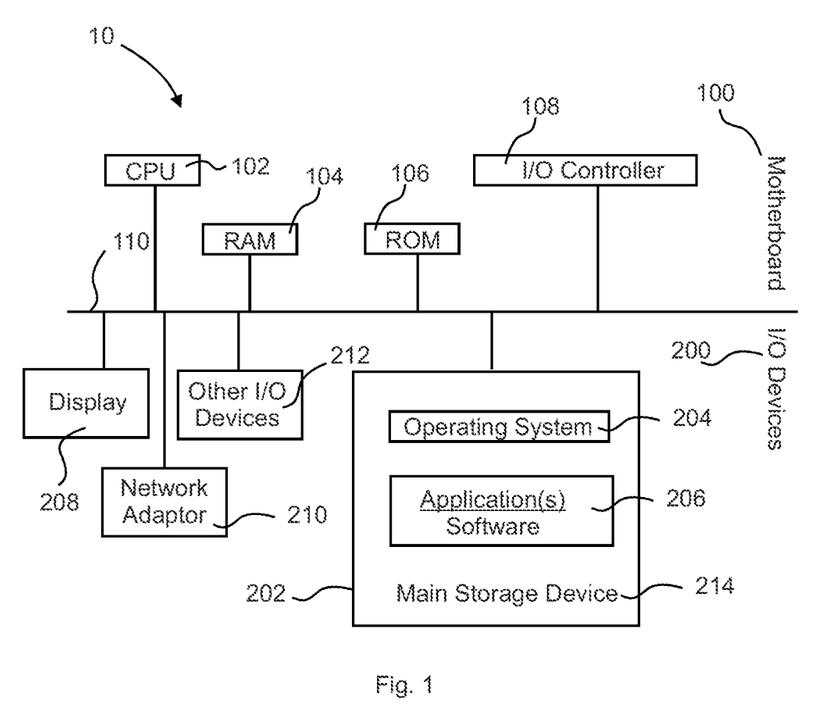
FIG. 1 is a block diagram of a computer system of the present disclosure of a bet information advisor platform.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processor to execute an instruction (s) such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
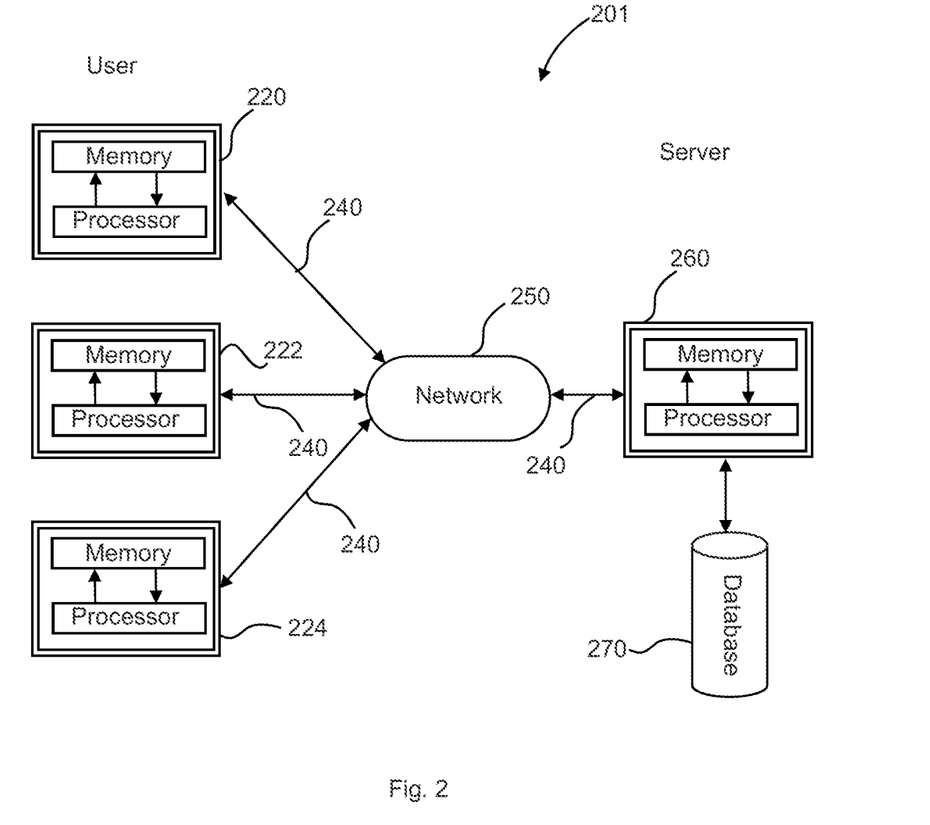
FIG. 2 is a block diagram of a communications system implemented by the computer system in FIG. 1.

Referring now to FIG. 2, there is illustrated a diagram depicting an exemplary communication system 201 in which concepts consistent with the present disclosure may be implemented. Examples of each element within the communication system 201 of FIG. 2 are broadly described above with respect to FIG. 1. In particular, the server system 260 and user 220, 222, 224 have attributes similar to computer system 10 of FIG. 1 and illustrate one possible implementation of computer system 10. Communication system 201 preferably includes one or more user 220, 222, 224, one or more server system 260, and network 250, which could be, for example, the Internet, public network, private network or cloud. User 220, 222, 224 each preferably includes a computer-readable medium, such as random access memory, coupled to a processor. The processor, CPU 102, executes program instructions or operations stored in memory. Communication system 201 typically includes one or more user 220, 222, 224. For example, user 220, 222, 224 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user 220, 222, 224, server system 260 preferably includes a computer-readable medium, such as random access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communications system 201 is capable of delivering and exchanging data between user 220, 222, 224 and a server system 260 through communications link 240 and/or network 250. Through user 220, 222, 224, users can preferably communicate over network 250 with each other user 220, 222, 224, and with other systems and devices, such as server system 260, to electronically collect, transmit, manipulate, display, store, print and/or view bettor data utilizing betting level of profitability system 301 (see FIG. 3). Communications link 240 typically includes network 250 making a direct or indirect communication between the user 220, 222, 224 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathway.

It is contemplated herein that RAM 104, main storage device 214, and database 270 may be referred to herein as storage device(s) or memory device(s).

Figure 3:
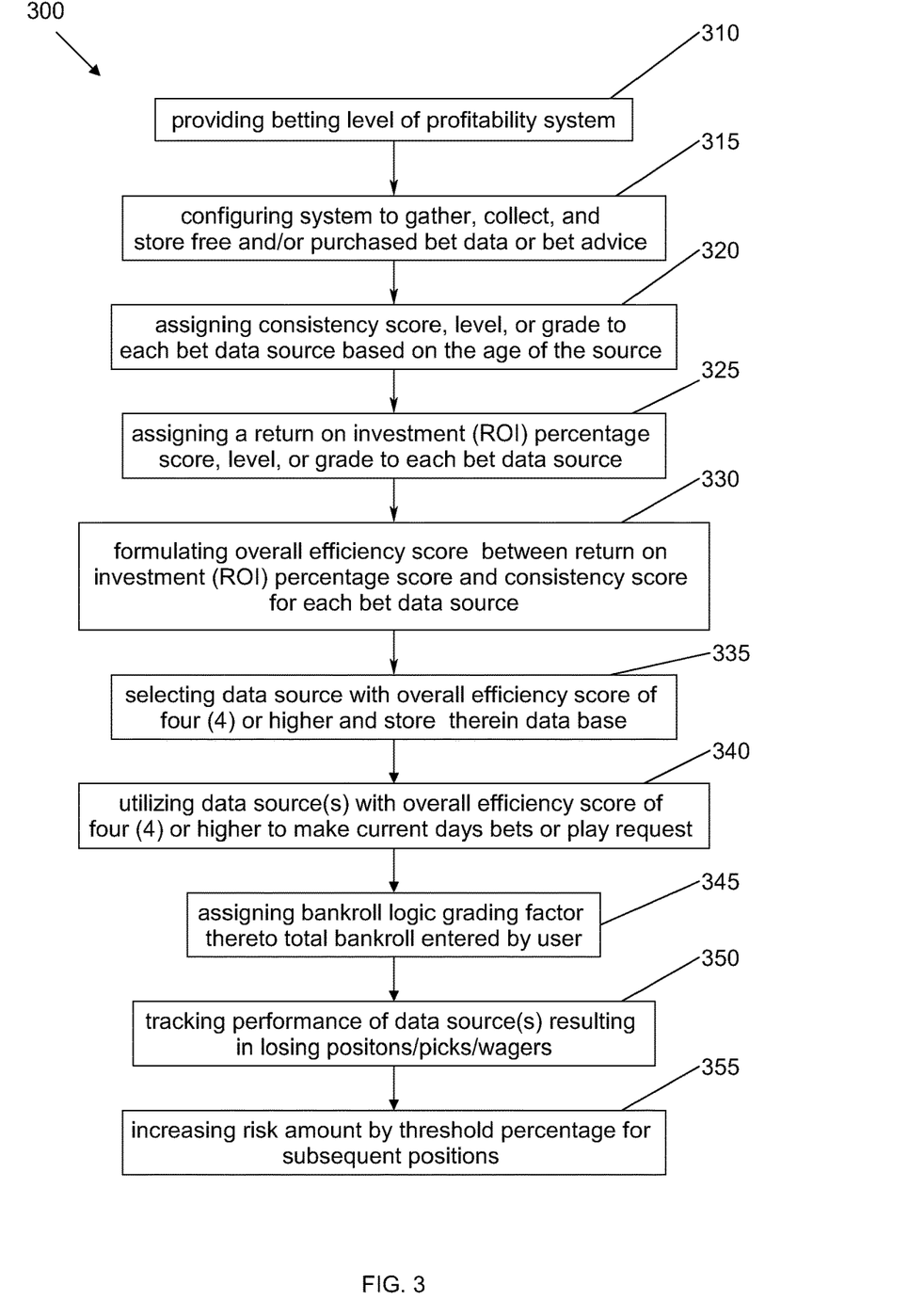
FIG. 3 is a system and flow diagram of an exemplary embodiment of betting level of profitability system implemented on the bet information advisor platform shown in FIGS. 1 and 2.

Referring now to FIG. 3, by way of example, and not limitation, there is illustrated a set of instructions for computer system 10, user 220, 222, 224 and/or server system 260 utilizing betting level of profitability system 301 or flow diagram 300 of an exemplary embodiment of utilizing betting level of profitability system 301. Preferably betting level of profitability system 300 may be configured as algorithm, software or applications 206 operating and/or executing instructions or operations on computer system 10, user 220, 222, 224 and/or server system 260 (shown in FIGS. 1 and 2). In block or step 310, providing betting level of profitability system 301, preferably as described above in FIGS. 1-2. In block or step 315, configuring betting level of profitability system 301 (or may be configured) to preferably gather, collect, receive, and store free and/or purchased bet data or bet advice 303 from bet sources, such as bet data source 302 from numerous websites or handicapping information outlets, in order to gain an advantage on certain bet types 304, such as team or teams, risk levels, risk, position against the spread, on the Money Line, on the Total, on their Fantasy Sports Mock Draft Lineup/Team, or a combination of two or more risk or positions known as a combo risk/bet "Parlay" or "Teaser" or Pari-Mutuel risk, Parlays Teasers and Straight bets.

It is contemplated herein that betting level of profitability system 301 may gather, collect, and store free and/or purchased data or advice from sources other than betting, such as stock or other investment information (bet data) from stock or other investment information outlets (bet type) and apply profitability system 301 thereto such information.

In block or step 320, configuring betting level of profitability system 301 (or may be configured) to assign (assigning) or determine consistency score, level, or grade 306 to/for each bet data source 302 (may be categorized by sport) and stores consistency score, level, or grade 306 in data base 270. Betting level of profitability system 300 preferably assigns a grade of zero (0, zero age) to bet data source 302 deemed to be new data source with historical data of less than 90 days in length, duration, or age (data source is 1-90 days since published as compared Date (current date)). Betting level of profitability system 300 preferably assigns a grade of one (1, one age) to bet data source 302 deemed to be young data source with historical data between 91 days and 365 in duration or age (data source is 91-365 days since published as compared Date (current date)). Betting level of profitability system 300 preferably assigns a grade of two (2, two age) to bet data source 302 deemed to be aged data source with historical data between 366 days and 2 years in length, duration or age (data source is 366 days-2 years since published as compared Date (current date)). Betting level of profitability system 300 preferably assigns a grade of three (3, three age) to bet data source 302 deemed to be mature data source having historical data greater than 2 years in length, duration or age (data source is 365 days-2 years since published as compared Date (current date)).

It is contemplated herein that different percentage score, level, nomenclature, or grade may be assigned herein to consistency score, level, or grade 306.

In block or step 325, configuring betting level of profitability system 301 (or may be configured) to assign (assigning) or determine return on investment (ROI) percentage score, level, or grade 308 to each bet data source 302 (may be categorized by sport) and store return on investment (ROI) percentage score, level, or grade 308 in data base 270. Betting level of profitability system 301 may be configured to take each historical match or game outcome based on profits earned or lost for each individual game and sums the total earned or loss amongst all matches within a given sport, and divides that total by the total amount risked as a separate sum to produce a return on investment percentage by sport or category. Betting level of profitability system 300 preferably assigns a grade of zero (0, zero profitable) to bet data source(s) 302 that turn a profit of or turn a return on Investment (ROI) of minus twenty percent of 0.20 up to one hundred percent (−20% of −0.20 up to −100%), poor bet data source(s) 302. Betting level of profitability system 300 preferably assigns a grade of one (1) to bet data source(s) 302 that turn a profit of or return on Investment (ROI) of minus ten percent to minus nineteen percent (−10% to −19%), marginal bet data source(s) 302. Betting level of profitability system 300 preferably assigns a grade of two (2) to bet data source(s) 302 that turn a profit of or return on Investment (ROI) of minus one percent to minus nine percent (−1% and −9%), moderate bet data source(s) 302. Betting level of profitability system 300 preferably assigns a grade of three (3) to bet data source(s) 302 that turn a profit of or a return on Investment (ROI) of zero to one hundred percent (0% up to 100%), profitable bet data source(s) 302.

It is contemplated herein that different percentage score, level, or grade may be assigned herein to return on investment (ROI) percentage score, level, or grade 308.

In block or step 330, configuring betting level of profitability system 301 (or may be configured) to formulate (formulating) or assign (assigning) or determine overall efficiency score 310 with regards to or between or utilizing return on investment (ROI) percentage score, level, or grade 308 and consistency score, level, or grade 306 to each bet data source 302 (may be categorized by sport) and store return on investment (ROI) percentage score, level, or grade 308 in data base 270. Betting level of profitability system 301 may assign (assigning) or formulate an overall efficiency score 310 by selecting data sources 302 with consistency score, level, or grade 306 of one (1, one age), two (2, two age), or three (3, three age) and assigning them overall efficiency score 310 for all data sources 302 with consistency score, level, or grade 306 of three (3, three age) and return on investment (ROI) percentage score, level, or grade 308 of zero (0, zero ROI) may be assigned overall efficiency score 310 of zero (0, zero overall efficiency score).

Moreover, return on investment (ROI) percentage score, level, or grade 308 of one (1, one ROI) may be assigned overall efficiency score 310 of three (3, three overall efficiency score), return on investment (ROI) percentage score, level, or grade 308 of two (2, two ROI) may be assigned overall efficiency score 310 of six (6, six overall efficiency score), and return on investment (ROI) percentage score, level, or grade 308 of three (3, three ROI) may be assigned overall efficiency score 310 of nine (9, nine overall efficiency score).

Betting level of profitability system 301 may assign or formulate an overall efficiency score 310 by selecting data sources 302 with consistency score, level, or grade 306 of two (2, two age) and return on investment (ROI) percentage score, level, or grade 308 such as zero (0, zero ROI) may be assigned overall efficiency score 310 of zero (0, zero overall efficiency score), Moreover, return on investment (ROI) percentage score, level, or grade 308 of one (1, one ROI) may be assigned overall efficiency score 310 of two (2, two overall efficiency score), return on investment (ROI) percentage score, level, or grade 308 of two (2, two ROI) may be assigned overall efficiency score 310 of four (4, four overall efficiency score), and return on investment (ROI) percentage score, level, or grade 308 of three (3, three ROI) may be assigned overall efficiency score 310 of six (6).

Betting level of profitability system 301 may formulate an overall efficiency score 310 by selecting data sources 302 with consistency score, level, or grade 306 of one (1, one age) and return on investment (ROI) percentage score, level, or grade 308 of zero (0, zero ROI) may be assigned overall efficiency score 310 of zero (0, zero overall efficiency score).

Moreover, return on investment (ROI) percentage score, level, or grade 308 of one (1, one ROI) may be assigned overall efficiency score 310 of one (1, one overall efficiency score), return on investment (ROI) percentage score, level, or grade 308 of two (2, two ROI) may be assigned overall efficiency score 310 of two (2), and return on investment (ROI) percentage score, level, or grade 308 of three (3) may be assigned overall efficiency score 310 of three (3).

In block or step 335, configuring betting level of profitability system 301 (or may be configured) to select (selecting) data source 302 with overall efficiency score 310 (may be categorized by sport) four (4) or higher and store data source 302 in data base 270. It is contemplated herein that values or thresholds different than four (4) or higher may be selected herein.

In block or step 340, configuring betting level of profitability system 301 (or may be configured) to utilize (utilizing) data source(s) 302 with overall efficiency score 310 (may be categorized by sport) of four (4) or higher to make current days bets or play request from user 220, 222, 224 based on data source(s) 302 related thereto the information user 220, 222, 224 requested such as team, risk/wager type such as parlay or straight position or player information for fantasy sports. Preferably, data source(s) 302 with overall efficiency score 310 (may be categorized by sport) of four (4) or higher for team, risk/wager type such as parlay or straight position or player information for fantasy sports or the like.

In block or step 345, configuring betting level of profitability system 301 (or may be configured) to assign (assigning) or determine risk amount 316 bankroll logic grading factor 312 thereto total bankroll or investment 314 entered by user 220, 222, 224 (amount to be bet). Betting level of profitability system 301 may assign or determine (assigning or bet or put at risk) one percent (1%) of total bankroll or investment 314 entered by user 220, 222, 224 (amount to be bet) to positions or plays or bets with overall efficiency score 310 (may be categorized by sport) of four (4), two percent (2%) of total bankroll or investment 314 entered by user 220, 222, 224 (amount to be bet) to positions or plays or bets with overall efficiency score 310 (may be categorized by sport) of six (6), or three percent (3%) total bankroll or investment 314 entered by user 220, 222, 224 (amount to be bet) to positions or plays or bets with overall efficiency score 310 (may be categorized by sport) of nine (9). It is contemplated herein that values or thresholds different than the percentage (%) of total bankroll or investment 314 may be selected herein.

In block or step 350, configuring betting level of profitability system 301 (or may be configured) to track (tracking) performance of data source(s) 302 resulting in losing positons/picks/wagers or performance of current bets or play request from user 220, 222, 224 based on data source(s) 302 related thereto the information user 220, 222, 224 requested such as team, risk/wager type such as parlay or straight position or player information for fantasy sports resulting in losing positons/picks/wagers.

In block or step 355, configuring betting level of profitability system 301 (or may be configured) to increase (increasing, detrimentally increment or up) assign, or determine risk amount 316 by threshold percentage 318, such as one percent (1%) on the next day's or subsequent positons/picks/wagers data source(s) 302, which resulted in losing positons/picks/wagers. It is contemplated herein that values or thresholds different than the risk amount percent (%) may be selected herein.

Betting level of profitability system 301 may be configured to identify or determine previous days winnings 320 and identify or determine previous days losing 322 positions/picks/wagers and keep/maintain/remove those data source(s) 302 from next day's or subsequent positons/picks/wagers data source(s) 302 for that user 220, 222, 224.

Figure 4:
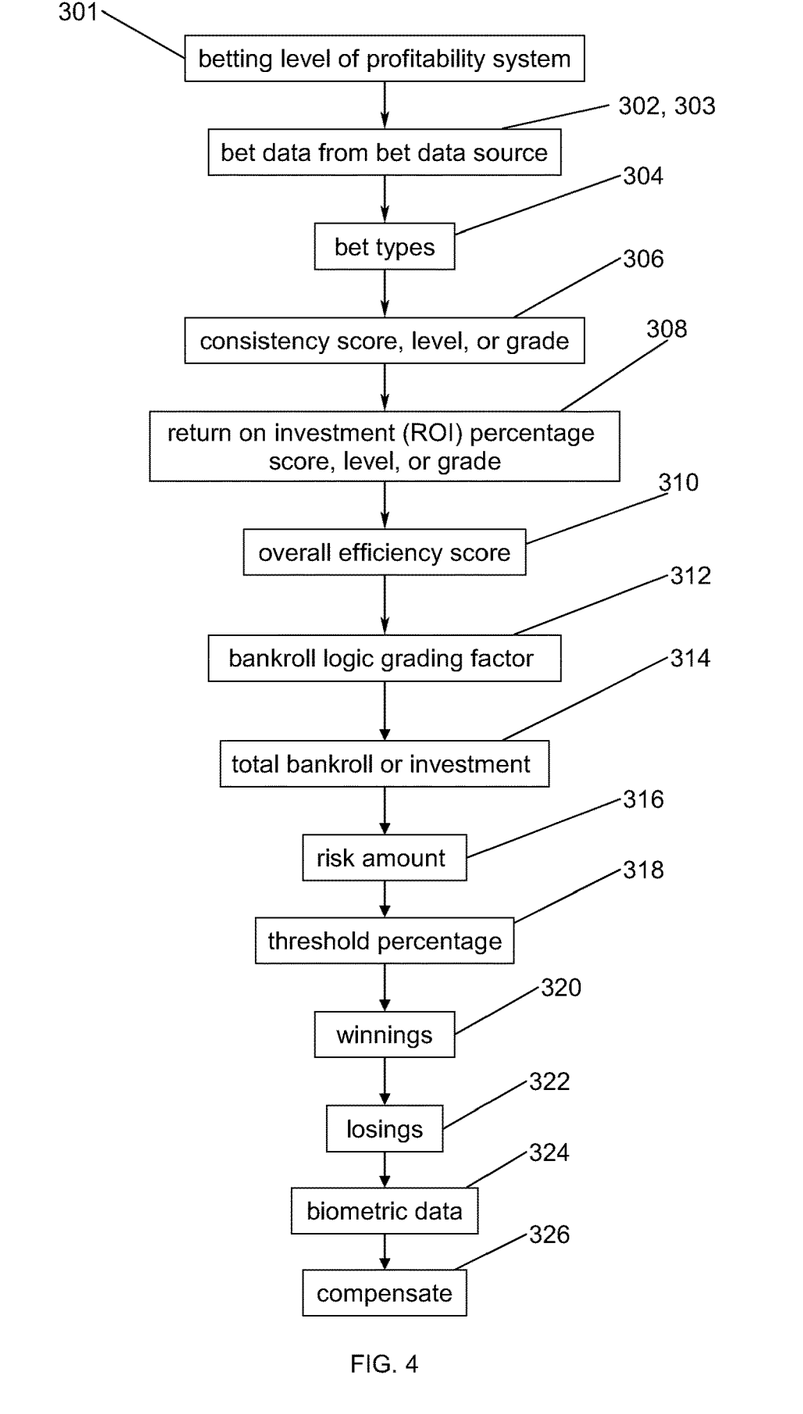
FIG. 4 is a flow diagram of an exemplary embodiment of the digital multi-dimensional image platform shown in FIG. 3.

Referring now to FIG. 4, by way of example, and not limitation, there is illustrated a block diagram 400 of an exemplary embodiment of utilizing betting level of profitability system 301. Preferably betting level of profitability system 300 may be configured as algorithm, software or applications 206 operating and/or executing instructions or operations on computer system 10, user 220, 222, 224 and/or server system 260 (shown in FIGS. 1 and 2). Betting level of profitability system 301 may be configured to track, calculate, assign, determine, or manipulate data entries relative to other data entries, such as bet data source(s) 302, bet types 304, assign or determine consistency score, level, or grade 306, assign or determine return on investment (ROI) percentage score, level, or grade 308, assign or determine overall efficiency score 310, assign or determine bankroll logic grading factor 312, assign or determine total bankroll or investment 314, assign or determine risk amount 316, assign or determine risk amount 316 by threshold percentage 318, identify or determine previous days winnings 320, identify or determine previous days losing 322, and biometric data 324. It is contemplated herein that data entries different than data entries identified herein may be selected herein and may be tracked, calculated, assigned, determined, or manipulated by betting level of profitability system 300.

Figure 5:
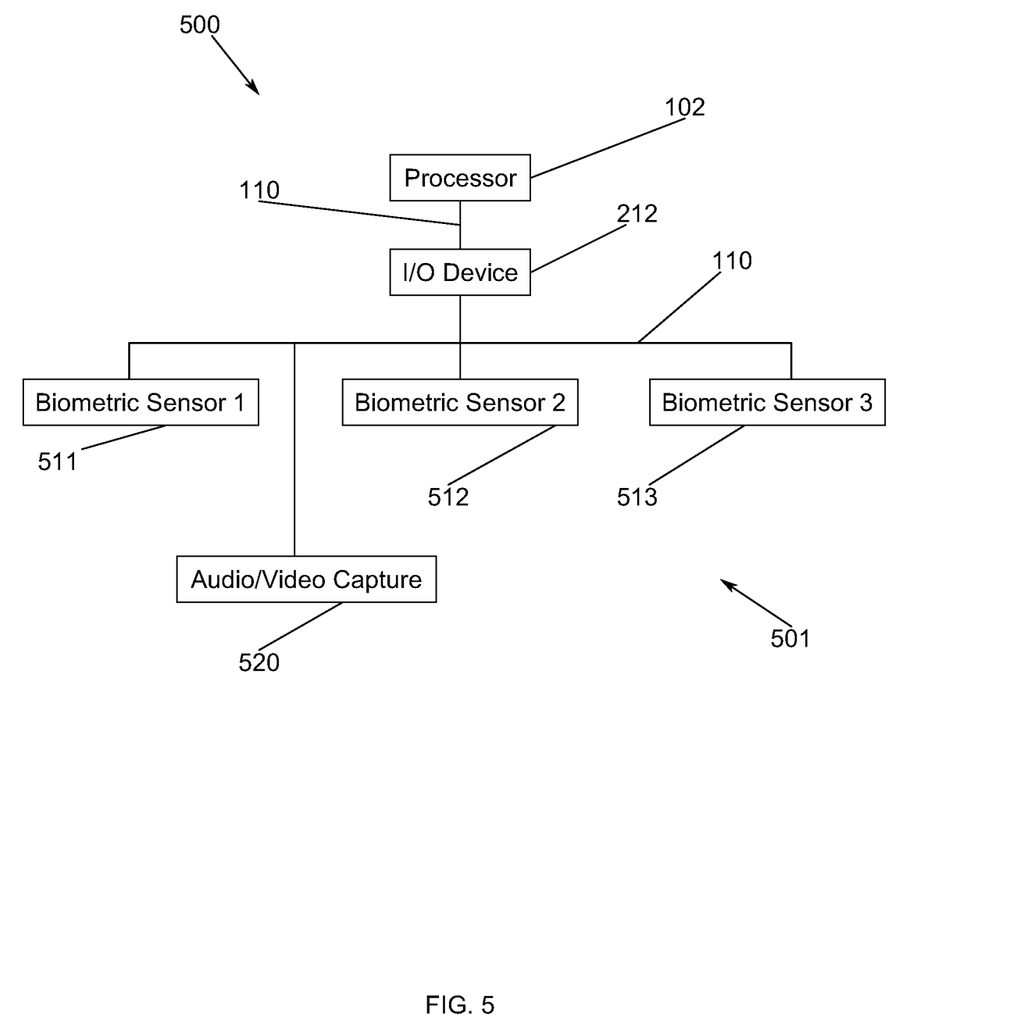
FIG. 5 is a block diagram of an exemplary embodiment of the digital multi-dimensional image platform shown in FIG. 3 with one or more input imagery applications.

Referring now to FIG. 5, by way of example, and not limitation, there is illustrated a system or subsystem biometric device 500 of an exemplary embodiment of utilizing betting level of profitability system 301. Preferably betting level of profitability system 300 may be configured to sense, collect, store, and utilize real time biometric data 324 via I/O devices 212, algorithm, software or applications 206 operating and/or executing instructions or operations on computer system 10, user 220, 222, 224 and/or server system 260 (shown in FIGS. 1 and 2). I/O devices 212 may include one or more biometric sensors 501, such as biometric sensor 1 511, biometric sensor 2 512, biometric sensor 3 513, and audio/video capture device 520, which may include sports prediction glasses, goggles, synchronized FITBIT, or other like commercially available system or subsystem biometric device 500. System or subsystem biometric device 500 may be utilized to sense, read, and collect biometric data 324, such as voice commands, eye movements, muscle tension, hear rate, temperature, reverse view pupil changes, forward view environment information (such as to detect TV/monitor programming, game, match or mock draft player stat), oxygen levels, eye movements, voice activations, whether positioned on, internal, or proximate user 220, 222, 224.

Preferably betting level of profitability system 300 may be configured as algorithm, software or applications 206 operating and/or executing instructions or operations on computer system 10, user 220, 222, 224 and/or server system 260 (shown in FIGS. 1 and 2). Betting level of profitability system 301 may be configured to collect and utilize biometric data 324 via one or more biometric sensors 501 to collect input variables as described in betting level of profitability system 300 by selecting bet types 304 via biometric data 324 to automatically levy risk positions or risk amounts 316 or adjust (adjusting) levy risk positions or risk amounts 316 or other variables or data points herein with, for example, sports book based on returned biometric data 324 and/or selection by user 220. Once the event or events of bet types 304 have begun betting level of profitability system 300 may collect and utilize biometric data 324 of user 220 engaged in a television or live sporting event or events of bet types 304 to automatically adjust or change (adjusting) course of direction of levy risk positions, set risk levels, or risk amounts 316 positions established before the event started.

For example, biometric sensors 501, such as FITBIT, may be synchronized with betting level of profitability system 300 or glasses in order to communicate biometric data 324, such as heart rate along with oxygen levels mixed with the monitored activity of the users eye and pupils, mixing that activity with the information and data being viewed in order to make a decision to change course of direction on originally set risk levels and positions established before the event started. Betting level of profitability system 300 may detect certain levels of euphoric excitement in comparison to, panic or pure calculations. The synchronized betting level of profitability system 300 voice activations may deliver audio or visual suggestions based on biometric data 324 described, as betting level of profitability system 300 of tracking, scoring and assessing profit levels exceed the historical averages.

Betting level of profitability system 300 may utilize biometric data 324 of user 220 to determine levels of euphoric excitement in comparison to, panic or pure calculations adjust or change course of direction of levy risk positions, set risk levels, or risk amounts 316.

Betting level of profitability system 300 may be utilized to achieve a professional status in the field of competitive predictions or sports predictions by accessing user 220 social media platforms and assessing a position on one side or the other of a specific match, competition or race.

Betting level of profitability system 300 may access user 220 social media platforms activities and assessing a position on one side or the other of a specific match, competition or race to determine levels of euphoric excitement in comparison to, panic or pure calculations adjust or change course of direction of levy risk positions, set risk levels, or risk amounts 316.

Betting level of profitability system 300 may compensate 326 user 220 for performance through any type of asset exchange including block chain technology means and host any betting company may compensate 326 user 220 for performance above historical averages.

Betting level of profitability system 300 may be configured to trickle or separate out bet types 304. For example, betting level of profitability system 300 may elect or pick from bet data source(s) 302, such as graded bet data source A, B, C, D, E, F and betting level of profitability system 300 may display or present user 220 (who wants) with a two team parlay (multi-team parley), such as one high grades pick from bet data source A (bet data source(s) 302) and pair with a pick from bet data source E (bet data source(s) 302). As another alternative example, user 222 who wants a two team parlay, betting level of profitability system 300 may elect or pick from bet data source(s) 302 and may display or present user 222 with a two team parlay, such as a pick from bet data source B (bet data source(s) 302) and bet data source F (bet data source(s) 302). It is contemplated herein that betting level of profitability system 300 may display or present users 220 with picks or bets from any number or variety of bet data source(s) 302 and/or multi team parlay from any number or variety of bet data source(s) 302.

Betting level of profitability system 300 may compensate 326 user 220 via host gambling company user 224 for performance above historical averages.

Betting level of profitability system 300 may levy compensation or pyramid equity user 220 via host gambling company user 224 for performance of over performing or underperforming users 220 as there are values on both sides, whether host gambling company user 224 would like to solicit services to users 220 in order to gain or grow customer base, or if host gambling company user 224 is looking to make profits on investment capital being controlled by holding firm or hedge firm.

Betting level of profitability system 300 may be utilized by government bodies or Leagues looking to monitor the compliance, regulations and integrity of each user or betting company involved in order to protect consumers from unfair or unethical practices. When it comes to the actual use and function of betting level of profitability system 300 utilized by the sports betting companies or government agencies, the biometric sensors 501, such as glasses and FITBIT would visually see and hear the input variables specified by the betting company or government user when it comes to the level of performance they are looking to categorize by each sports bettor or professional bettor and would be able to see different performance categories in correlation to the biometrics being gathered by biometric sensors 501. Betting level of profitability system 300 may utilize biometric data 324 of the government or betting company user in order to levy instructions based on defined law, or simply company policy or targets when it comes to the marketing goal or strategy.

It is contemplated herein that computer system 10, user 220, 222, 224, and/or server system 260 may execute any of the steps in the flowcharts herein for inputting, storing, analyzing, reporting, transmission, and trending of betting level of profitability system 301.

It is further contemplated herein that computer system 10, user 220, 222, 224, and/or server system 260 may provide transmission of articles, audio, text message, and video relating to biometric data 324.

It is still further contemplated herein that betting level of profitability system 300 may be utilized by user 220 to become a professional in the field of competitive Predictions or sports predictions.

The foregoing description and drawings comprise illustrative embodiments of the present disclosure. Having thus described exemplary embodiments, it should be noted by those of ordinary skill in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail; it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A computer system to raise a betting level profitability of a bettor, the computer system comprising:
    a memory device for storing a plurality of instructions, a bet data source having a bet data, and a bet type, said bet data source is a data source offering an at least one bet trend;
    a sensor capable of obtaining a forward view environment information of the bettor; and
    a processor in communication with said memory and said sensor and configured to, via communication with said memory, cause the processor to:
        receive said bet data from said bet data source;
        receive said bet type;
        execute a first instruction from said plurality of instructions the first instruction to determine an overall efficiency score for each said bet data source;
        execute a second instruction from said plurality of instructions, the second instruction to select each said bet data source having said overall efficiency score;
        execute a third instruction from said plurality of instructions, the third instruction to elect a risk position utilizing said bet data source having said overall efficiency;
        execute a fourth instruction from said plurality of instructions, the fourth instruction to track said bet data source and collect said forward view environment information;
        execute a fifth instruction from said plurality of instructions, the fifth instruction to increment a risk amount of said bet data source for a subsequent bet, based upon said forward view environment information; and
        adjust said bet type and said risk amount based on said at least one user input.

2. The system of claim 1, wherein said processor is further configured to execute the following instructions:
    a sixth instruction to assign a zero age to a new said bet data source;
    a seventh instruction to assign a one age to a young said bet data source;
    an eighth instruction to assign a two age to an aged said bet data source; and
    a ninth an instruction to assign a three age to a mature said bet data source.

3. The system of claim 2, wherein said processor is further configured to execute an instruction to assign a three ROI to a profitable said return on investment percentage score.

4. The system of claim 3, wherein said processor is further configured to execute an instruction to assign a two ROI to a moderate said return on investment percentage score.

5. The system of claim 4, wherein said processor is further configured to execute an instruction to assign a one ROI to a marginal said return on investment percentage score.

6. The system of claim 5, wherein said processor is further configured to execute an instruction to assign a zero ROI to a poor said return on investment percentage score.

7. The system of claim 6, wherein said processor is further configured to execute an instruction to assign three overall efficiency score to said bet data source having said young said bet data source and said profitable said return on investment percentage score.

8. The system of claim 7, wherein said processor is further configured to execute an instruction to assign a two overall efficiency score to said young said bet data source having said good said return on investment percentage score.

9. The system of claim 6, wherein said processor is further configured to execute an instruction to assign four overall efficiency score to said young said bet data source having said marginal said return on investment percentage score.

10. The system of claim 6, wherein said processor is further configured to execute an instruction to collect a biometric data via a biometric sensor proximate said user and adjusting a position based on said biometric data.

11. The system of claim 1, wherein said processor is further configured to execute an instruction to present a bet to a user utilizing said bet data source having said overall efficiency score greater than or equal to four.

12. The system of claim 1, wherein said processor is further configured to execute an instruction to present a bet to a user utilizing one or more said bet data sources.

13. The system of claim 12, wherein said bet is a multi-team parlay or a pari-mutuel position.

14. The system of claim 1, wherein said processor is further configured to execute an instruction to compensate a user for a performance above an average and said performance by said user is selected from a group consisting of a social media, a forum, a contest, a rebate, an affiliate, and combinations thereof.

15. The system of claim 14, wherein said user is selected from a group consisting of a contestant, a consultant, a handicapper, said data source, a casino, a sports book, a governing body, an end user, and a participant.

16. The system of claim 14, wherein said compensation is selected from a group consisting of a currency, a crypto currency, a token, a blockchain, and a combinations thereof.

17. A method of raising a betting level profitability of a bettor, said method utilizing a computer processor connected to a memory device and a sensor capable of collecting a forward view information, the computer processor configured to execute an instruction comprising the steps of:
  inputting a bet data from a bet data source onto said memory device;
  inputting a bet type onto said memory device;
  determining an overall efficiency score for each said bet data source;
  selecting each said bet data source data source having said overall efficiency;
  electing a risk position utilizing said bet data source having said overall efficiency score;
  tracking said bet data source;
  collecting a forward view environment information; and
  incrementing a risk amount of said bet data source for a subsequent bet.

18. The system of claim 1, wherein said user is selected from a group consisting of a contestant, a consultant, a handicapper, said data source, a casino, a sports book, a governing body, and an end user, said user is capable of setting a money management strategy.

19. The system of claim 18, wherein said data source is selected from a group consisting of a contestant, a consultant, a handicapper, said data source, a casino, a sports book, a governing a body, and an end user.

20. The system of claim 19, wherein said user is selected from a group consisting of a contestant, a consultant, a handicapper, said data source, a casino, a sports book, a governing body, and an end user, said user is engaged in a normal course of assigning an odds, setting an odds pricing, targeting marketing strategy based on said odds and said odds pricing, and accounting for a latency in a live or a recorded broadcast based on said odds and said odds pricing, said odds are subject to a daily, an hourly, or a live adjustment.

* * * * *